(12) United States Patent
Chang et al.

(10) Patent No.: US 8,255,775 B2
(45) Date of Patent: Aug. 28, 2012

(54) METHOD AND APPARATUS OF CANDIDATE LIST AUGMENTATION FOR CHANNEL CODING SYSTEM

(75) Inventors: Hsie-Chia Chang, Hsinchu (TW); Yen-Chin Liao, Taipei (TW)

(73) Assignee: National Chiao Tung University, Hsinchu (TW)

( * ) Notice: Subject to any disclaimer, the term of this patent is extended or adjusted under 35 U.S.C. 154(b) by 1042 days.

(21) Appl. No.: 12/182,214

(22) Filed: Jul. 30, 2008

(65) Prior Publication Data

US 2010/0031113 A1   Feb. 4, 2010

(51) Int. Cl.
*G06F 11/00* (2006.01)

(52) U.S. Cl. .................................. 714/780; 375/341

(58) Field of Classification Search .................. None
See application file for complete search history.

(56) References Cited

U.S. PATENT DOCUMENTS 7,720,169 B2 * 5/2010 Reuven et al. ................ 375/267
2005/0210039 A1 9/2005 Garrett

OTHER PUBLICATIONS

B. M. Hochwald and S. ten Brink, "Achieving near-capacity on a multiple-antenna channel," IEEE Trans. Commun., vol. 51, No. 3, pp. 389-399, Mar. 2003.
C. Kuhn and J. Hagenauer, "Iterative detection of MIMO transmission using a list-sequential (liss) detector," Proc. IEEE Int. Conf. Commun., 2003, pp. 2653-2657.
Z. Guo and P. Nilsson, "Algorithm and implementation of the K-best sphere decoding for MIMO detection," IEEE JSAC, vol. 24m No. 3, pp. 491-503, Mar. 20.

* cited by examiner

*Primary Examiner* — Michael Maskulinski
(74) *Attorney, Agent, or Firm* — Rosenberg, Klein & Lee

(57) ABSTRACT

The present invention discloses a candidate list augmentation apparatus with dynamic compensation in the coded MIMO systems. The proposed path augmentation technique in the present invention can expand the candidate paths derived from the detector to a distinct and larger list before computing the soft value of each bit. Consequently, the detector is allowed to deliver a smaller list, leading to reduction in computation complexity. Moreover, an additive correction term is introduced to dynamically compensate the approximation inaccuracy in the soft value generation, which improves the efficiency and performance of the coded MIMO systems.

17 Claims, 5 Drawing Sheets

METHOD AND APPARATUS OF CANDIDATE LIST AUGMENTATION FOR CHANNEL CODING SYSTEM

BACKGROUND OF THE INVENTION

1. Field of the Invention

The invention relates to a candidate list augmentation apparatus and method for channel coding system, and more particularly, a candidate list augmentation apparatus which is able to detect signal with dynamic compensation in the multi-input multi-output (MIMO) channel coding systems.

2. Description of the Related Art

Multiple input multiple output (MIMO) technology draws great attention due to its ability to improve transmission efficiency. Among several MIMO detection schemes, maximum likelihood (ML) detection is one of the most well known in the art which is being commonly used to fully utilize the diversity gain. With an additive white Gaussian channel noise assumption, ML detection can be reduced to a closest-point-search problem in a given lattice. Moreover, although MIMO system performance is boosted by the diversity gain, channel coding is often employed to provide extra coding gain such that systems are allowed to perform better in case of lower signal-to-noise-ratio (SNR). Since exhaustive search is infeasible for large number of antennas or high level signal modulation, sphere decoding has been proposed to perform exhaustive search after confining the search range by a radius. With properly chosen radius, sphere decoding has been proved to approach the performance of ML detection.

Please refer to FIG. 1 for a block diagram schematically showing a conventional MIMO system 100 with channel coding schemes. The conventional MIMO system 100 includes a channel encoder 102, a spatial mapping device 104, a transmit device 106, a receive device 108, a sphere decoder 110, and a channel decoder 112. Assume that the transmit device 106 includes $N_t$ transmit antennas and the receive device 108 includes $N_r$ antennas. The channel encoder 102 is utilized to channel code the original signal u and generate the coded bits $x=[x^{(1)}, x^{(2)}, \ldots, x^{(L)}]^T$. The spatial mapping device 104 then modulates the coded bits x through L time slots. Here, Each vector $x^{(t)}=[x_1^{(t)}, x_2^{(t)}, \ldots, x_{Nt \times 2Mc}^{(t)}]$ with the time index t is mapped to the transmitted vector $\tilde{s}^{(t)}=[\tilde{s}_1^{(t)}, \tilde{s}_2^{(t)} \ldots \tilde{s}_{Nt}^{(t)}]^T$ by $\tilde{M}(\bullet)$, which maps $2M_c$ bits to a complex signal. For simplicity, the spatial mapping in the spatial mapping device 104 refers to direct spatial multiplexing, and $M^2$-QAM-mapped signals are considered henceforth.

After mapping the signal, the transmit device 106 transmits through the complex signal based on the transmitted vector $\tilde{s}^{(t)}$ and the receive device 108 receives the real signal according to the received vector $\tilde{y}^{(t)}$. The relation between the transmitted vector $\tilde{s}^{(t)}$ and the received vector $\tilde{y}^{(t)}$ can be expressed by:

$$\tilde{y}^{(t)} = \tilde{H}^{(t)}\tilde{s}^{(t)} + \tilde{n}^{(t)} \tag{1}$$

where the channel $\tilde{H}^{(t)}$ is an $N_r \times N_t$ matrix of independent and identically distributed (i.i.d.) complex Gaussian random variables; $\tilde{n}^{(t)}$ is an $N_r \times 1$ i.i.d. complex Gaussian noise vector. The complex model in the equation (1) can be further rewritten as:

$$y^{(t)} = \begin{bmatrix} R\{\tilde{y}^{(t)}\} \\ L\{\tilde{y}^{(t)}\} \end{bmatrix} = \begin{bmatrix} R\{\tilde{y}^{(t)}\}, & -L\{\tilde{H}^{(t)}\} \\ L\{\tilde{H}^{(t)}\}, & R\{\tilde{y}^{(t)}\} \end{bmatrix} \begin{bmatrix} R\{\tilde{s}^{(t)}\} \\ L\{\tilde{s}^{(t)}\} \end{bmatrix} + \begin{bmatrix} R\{\tilde{n}^{(t)}\} \\ L\{\tilde{n}^{(t)}\} \end{bmatrix} = H^{(t)}s^{(t)} + n^{(t)} \tag{2}$$

where $R\{\bullet\}$ and $L\{\bullet\}$ refer to the real and the imaginary parts, respectively, of the complex signal $s^{(t)}$. Thus, the Nt-dimensional complex M2-QAM signals $s^{(t)}$ are transformed into 2Nt-dimensional real M-PAM signals $y^{(t)}$. For simpler notation, the time index t will be omitted hereafter.

Based on the equation (2), ML solution can be derived by searching all over the $2N_t$-dimensional constellation space $\Omega^{2Nt}$ for the minimizer:

$$\hat{s}_{ML} = \arg\max_{s' \in \Omega^{2Nt}} \|y - Hs'\|^2 \tag{3}$$

where the cost function $\|\bullet\|^2$ refers to Euclidean norm. As shown in the equation (3), the exhaustive search for the minimizer $\hat{s}_{ML}$ becomes infeasible since the computation grows exponentially with $N_t$ and L. Therefore, the sphere decoder 110 in the conventional MIMO system utilizes sphere decoding algorithm as a means to solve the closest-lattice-point searching problem.

The sphere decoder 110 first confines the search range by a predefined radius r; and only the path metric of the s' in the hypersphere $\|y-Hs'\|^2 \leq r^2$ will be compared. That is, the equation (2) can be computed by:

$$\hat{s}_{ML} \approx \hat{s}_{SD} = \arg\min_{s' \in \Omega^{2Nt}, \|y-Hs'\|^2 \leq r^2} \|y - Hs'\|^2 \tag{4}$$

Here, if the radius r is chosen properly such that at least one path s' satisfies the radius constraint.

Next, the sphere decoder 110 will preprocess on y to transform the equation (4) into a tree-search problem. By QR-decomposition, for instance, the channel matrix is decomposed by H=QR where $Q^TQ=I_{2Nr}$, an identity matrix of size $2N_r$, and R is a $2N_t \times 2N_t$ upper triangular matrix. By multiplying y with $Q^T$, the sphere decoder 110 can transformed the equation (4) into:

$$\hat{s}_{ML} = \arg\min_{s' \in \Omega^{2Nt}} \|q - Rs'\|^2 \tag{5}$$

where $q=[q_1, q_2, \ldots, q_{2Nt}]=Q^T y$. Each s' in $\Omega^{2Nt}$ is defined as a "path" that traverses from the root to the leaf of the search tree. Every path consists of $2N_t$ nodes representing the $2N_t$ points of the $2N_t$-layered tree. Moreover, the cost function of each path, i.e. $\|q-Rs'\|^2$, will be referred to "path metric" and can be calculated by:

$$\|q - Rs'\|^2 = \sum_{i=1}^{2Nt}\left(q_i - \sum_{j=i}^{2Nt} R_{i,j}s_j\right)^2 = \sum_{i=1}^{2Nt} e(s^{(i)}) \tag{6}$$

where $s^{(i)}$ represents the i-th to 2Nt-th elements of s', that is, $s^{(i)}=[s_i, s_{i+1}, \ldots, s_{2Nt}]^T$. Moreover, the partial Euclidean distance (PED) of $s^{(i)}$, $T(s^{(i)})$, is defined by:

$$T(s^{(i)}) = \sum_{i'=i}^{2Nt}\left(q_{i'} - \sum_{j=i'}^{2Nt} R_{i',j}s_j\right)^2 = T(s^{(i+1)}) + e(s^{(i)}) \tag{7}$$

Based on this conventional sphere decoding algorithm, the minimizer $\hat{s}_{ML}$ can be found as long as each path has been searched. However, the traditional sphere decoding algorithm remains a major challenge in acquiring accurate probabilistic information. Limited by the complex computation of sphere decoding, and inconstant decoding throughput could cause inefficient VLSI implementation.

Different from the sphere decoding algorithm that outputs only the ML path, the conventional MIMO system utilizes the modified list sphere decoding algorithm to deliver a candidate list L that consists of the most reliable paths. Please refer to FIG. 2 for a block diagram schematically showing another conventional MIMO system 200 with list sphere coding schemes. The conventional MIMO system 200 includes a channel encoder 202, a spatial mapping device 204, a transmit device 206, a receive device 208, a list sphere decoder 210, and a channel decoder 216. Since the elements of the same name in the FIG. 1 and FIG. 2 have the same function and operation, detailed description is omitted for the sake of brevity. The main different between the MIMO systems 100 and 200 is that the MIMO systems 200 further includes the list sphere decoder 210. The list sphere decoder 210 includes a candidate list generation device 212 and a soft value generation device 214. The candidate list generation device 212 is utilized to generate a candidate list L. Assume that |L| is the list size. Based on the system model in the equation (2), the most reliable |L| paths are equivalent to the paths corresponding to the least |L| path metrics. After generating the candidate list L, the soft value generation device 214 then computes the soft input signal from the list L for the subsequent channel decoder 216. Different soft input signal can result in different error correcting capability for the following channel decoding. The operation of the candidate list generation device 212 and the soft value generation device 214 are further detailed as follows.

Let $M(\cdot)$ denote the M-PAM mapping function such that $s_k = M(x_{k,1}, x_{k,2}, \ldots, x_{k,Mc})$. For any path $s' \in L$, the soft value of $x_{k,j}$ is defined by its "a posteriori" probabilities:

$$L(x_{k,j}) = \log \frac{Pr(x_{k,j} = 0 | y)}{Pr(x_{k,j} = 1 | y)} \quad (8)$$

$$= \log \frac{Pr(x_{k,j} = 0)}{Pr(x_{k,j} = 1)} + \log \frac{Pr(y | x_{k,j} = 0)}{Pr(y | x_{k,j} = 1)} \quad (9)$$

The first term in the equation (9), which is the "a priori" information, is zero for the ML detection or can be computed by the extrinsic information provided by the channel decoder in an iterative detection decoding process. The second term in the equation (9) can be computed by:

$$\log \frac{Pr(y | x_{k,j} = 0)}{Pr(y | x_{k,j} = 1)} = \log \frac{\sum_{s' \in \Omega_{j,0}} Pr(y|s')}{\sum_{s' \in \Omega_{j,1}} Pr(y|s')} \quad (10)$$

$$\approx \frac{1}{2\sigma^2} \left( \min_{s' \in \Omega_{j,1}} \|y - Hs'\|^2 - \min_{s' \in \Omega_{j,0}} \|y - Hs'\|^2 \right) \quad (11)$$

$$\approx \frac{1}{2\sigma^2} \left( \min_{s' \in \Omega_{j,1} \cap L} \|y - Hs'\|^2 - \min_{s' \in \Omega_{j,0} \cap L} \|y - Hs'\|^2 \right) \quad (12)$$

Where $\sigma^2$ is the noise variance, and $\Omega_{j,b}$ is the set of all path s' having $x_{k,j} = b$ for $b = 0, 1$. That is, $\Omega_{j,0}$ represents the set of all s' having $x_{k,j} = 0$, and $\Omega_{j,0}$ represents the set of all s' having $x_{k,j} = 1$. Usually, the candidate list generation device 212 will generate a sufficiently large list to ensure a high probability in finding the true minimizer in the equation (11) with (12). With preprocessing, the equation (12) will be replaced by:

$$\frac{1}{2\sigma^2} \left( \min_{s' \in \Omega_{j,1} \cap L} \|q - Rs'\|^2 - \min_{s' \in \Omega_{j,0} \cap L} \|q - Rs'\|^2 \right) \quad (13)$$

However, when one of the sets $\Omega_{j,0}$ and $\Omega_{j,0}$ can not find the path s' in the list L (i.e. $\Omega_{j,0} \cap L = 0$ or $\Omega_{j,1} \cap L = 0$), it is impossible to find the minimizer in an empty set, and the minima is often approximated by a predefined large constant. Being the soft input signals to the subsequent channel decoder 216, the additional interference resulted from the approximation inaccuracy can degrade the error performance. Although the degradation can be mitigated by increasing the list size to reduce the probability of $\Omega_{j,0} \cap L$ (or $\Omega_{j,1} \cap L$), being an empty set, the computation complexity in generating the candidate list also increases.

Therefore, to solve the above-mentioned problems, the present invention proposes a novel candidate list augmentation apparatus for channel coding system and method thereof along with dynamic compensation to improve the efficiency and performance of the coded MIMO systems.

SUMMARY OF THE INVENTION

It is therefore one of the many objectives of the claimed invention to provide candidate list augmentation apparatus and method thereof along with dynamic compensation to improve the efficiency and performance of the coded MIMO systems.

According to the claimed invention, a candidate list augmentation device is disclosed. The candidate list augmentation device includes a candidate list generation device for receiving an input signal within a coded MIMO system and generating a candidate list according to said input signal; a path augmentation device, coupled to said candidate list generation device, for augmenting paths in the candidate list according to said candidate list and generate an augmented list; and a soft value generation device, coupled to said candidate list generation device and said path augmentation device, for comparing said input signal and said augmented list and generating a soft value according to said input signal, said candidate list and said augmented list, wherein said soft value is utilized for error correcting in decoding said input signal.

Also according to the claimed invention, a candidate list augmentation method with low-complexity soft value generation for the coded MIMO systems is disclosed. The candidate list augmentation method includes (1) receiving an input signal and generating a candidate list according to said input signal; (2) generating an augmented list according to said candidate list; and (3) comparing said input signal and said augmented list and generating a soft value according to said input signal, said candidate list and said augmented list, wherein said soft value is utilized for error correcting in decoding said input signal.

Below, the embodiments of the present invention are described in detail in cooperation with the attached drawings to make easily understood the objectives, technical contents, characteristics and accomplishments of the present invention.

DETAILED DESCRIPTION OF THE INVENTION

Figure 1:
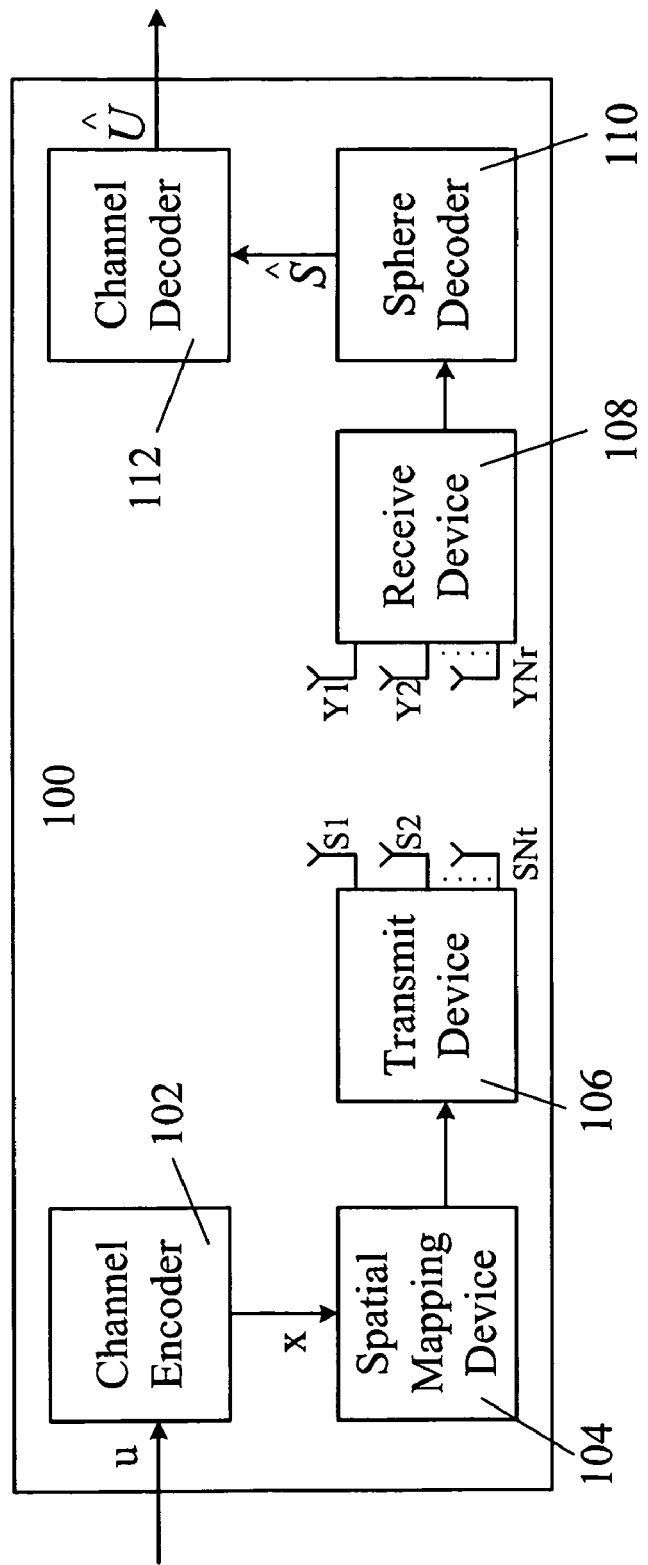
FIG. 1 is a block diagram schematically showing a conventional MIMO system with channel coding schemes.
Figure 2:
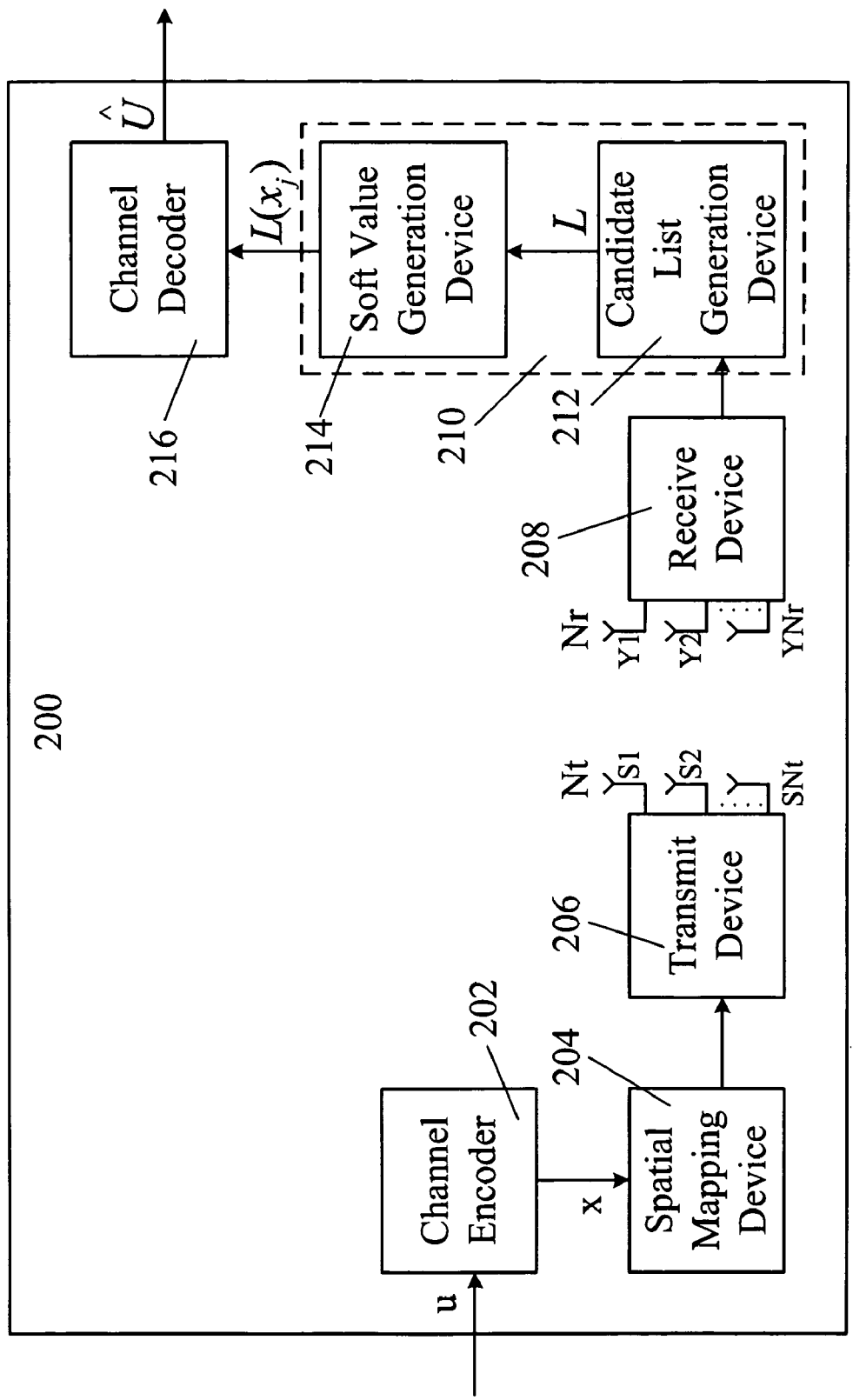
FIG. 2 is a block diagram schematically showing another conventional MIMO system with list sphere coding schemes.
Figure 3:
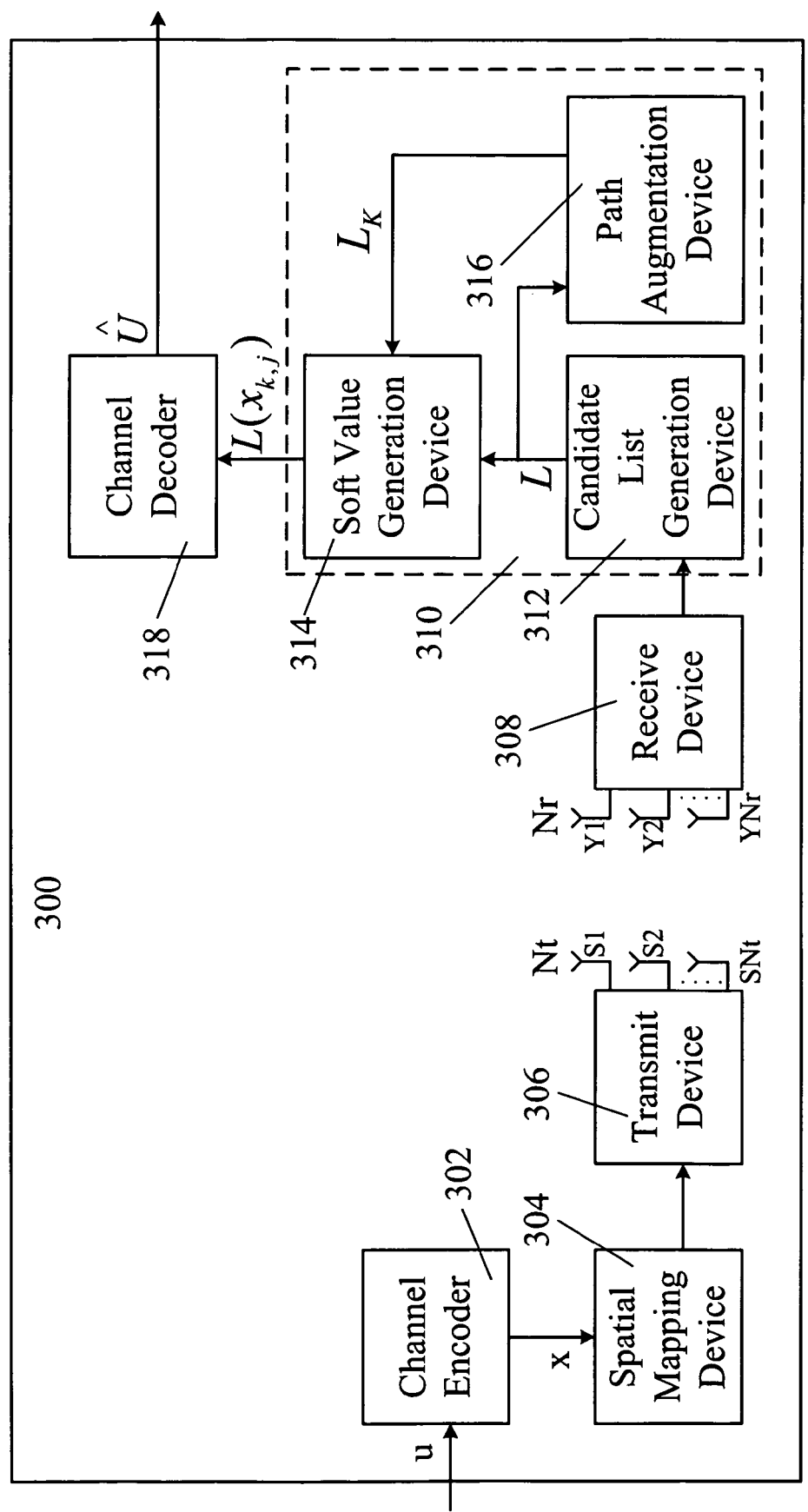
FIG. 3 is a block diagram schematically showing a MIMO system with candidate list augmentation scheme according to the present invention.

The present invention provides a candidate list augmentation device and method thereof for channel coding systems with dynamic compensation to improve the efficiency and performance of the channel coding system especially coded MIMO systems Please refer to FIG. 3 for a block diagram schematically showing a MIMO system 300 with candidate list augmentation scheme according to the present invention. The MIMO system 300 includes a channel encoder 302, a spatial mapping device 304, a transmit device 306, a receive device 308, a list sphere decoder 310, and a channel decoder 318. The list sphere decoder 310 includes a candidate list generation device 312, a soft value generation device 314, and a path augmentation device 316. The candidate list generation device 312 is mainly responsible for receiving an input signal within the coded MIMO system and generating a candidate list according to this input signal. As for the path augmentation device 316 which is coupled to the candidate list generation device 312, it is responsible for augmenting paths in the candidate list according to the candidate list and then generate an augmented list. The soft value generation device 314 which is coupled to the candidate list generation device 312 and the path augmentation device 316 provides comparison for the input signal and the augmented list, and then generates a soft value according to the input signal, the candidate list and the augmented list, wherein said soft value is utilized for error correcting in decoding the input signal. Since the elements of the same name in the FIG. 2 and FIG. 3 have the same function and operation, detailed description is omitted for the sake of brevity. In the present invention, the path augmentation device 316 is applied to equivalently provide a larger candidate list, and the probability of failing to find the minimizer in the augmented list is reduced accordingly. That is, the path augmentation device 316 can be treated as an enhancement; no modifications are required for the candidate list generation device 312 and the soft value generation device 314 based on the conventional schemes.

For the soft value $L(x_{k,j})$ computation, the path augmentation device 316 will expand each path s' in L to M paths by first duplicating s' M−1 times. Next, each the k-th element of the M identical paths is replaced by a distinct $\omega_j$ from $\Omega=\{\omega_j|j=0, 1, \ldots, M-1\}$, the M symbols of M-PAM constellation. This duplicating-and-replacing procedure continues until all the paths in L are examined. As a result, L is expended to $L_k$ and $|L_k|=M\times|L|$. Although identical paths may be found in $L_k$, $\Omega_{j,0}\cap L_k$ or $\Omega_{j,1}\cap L_k$ will never be empty sets since the augmented list contains all constellation points at the k-th layer. Besides, the paths in L are believed to be more reliable, and the augmented list is supposed to be reliable as well. It can be inferred that:

$$\min_{s'\in\Omega_{j,0}} \|y - Hs'\|^2 \approx \min_{s'\in\Omega_{j,0}\cap L_K} \|y - Hs'\|^2 \quad (14)$$

And $$\min_{s'\in\Omega_{j,1}} \|y - Hs'\|^2 \approx \min_{s'\in\Omega_{j,1}\cap L_K} \|y - Hs'\|^2 \quad (15)$$

Moreover, the path metric of the j-th expanded path from s' can be computed by $$T(s') + (\Delta_i R_{i,i})^2 + 2\left(y_i - \sum_{j=i}^{2N_t} R_{i,j}S_j\right)R_{i,i}\Delta_i \quad (16)$$

where $\Delta_j=s_k-\omega_j$ for j=0, 1, ..., M−1.

Figure 4:
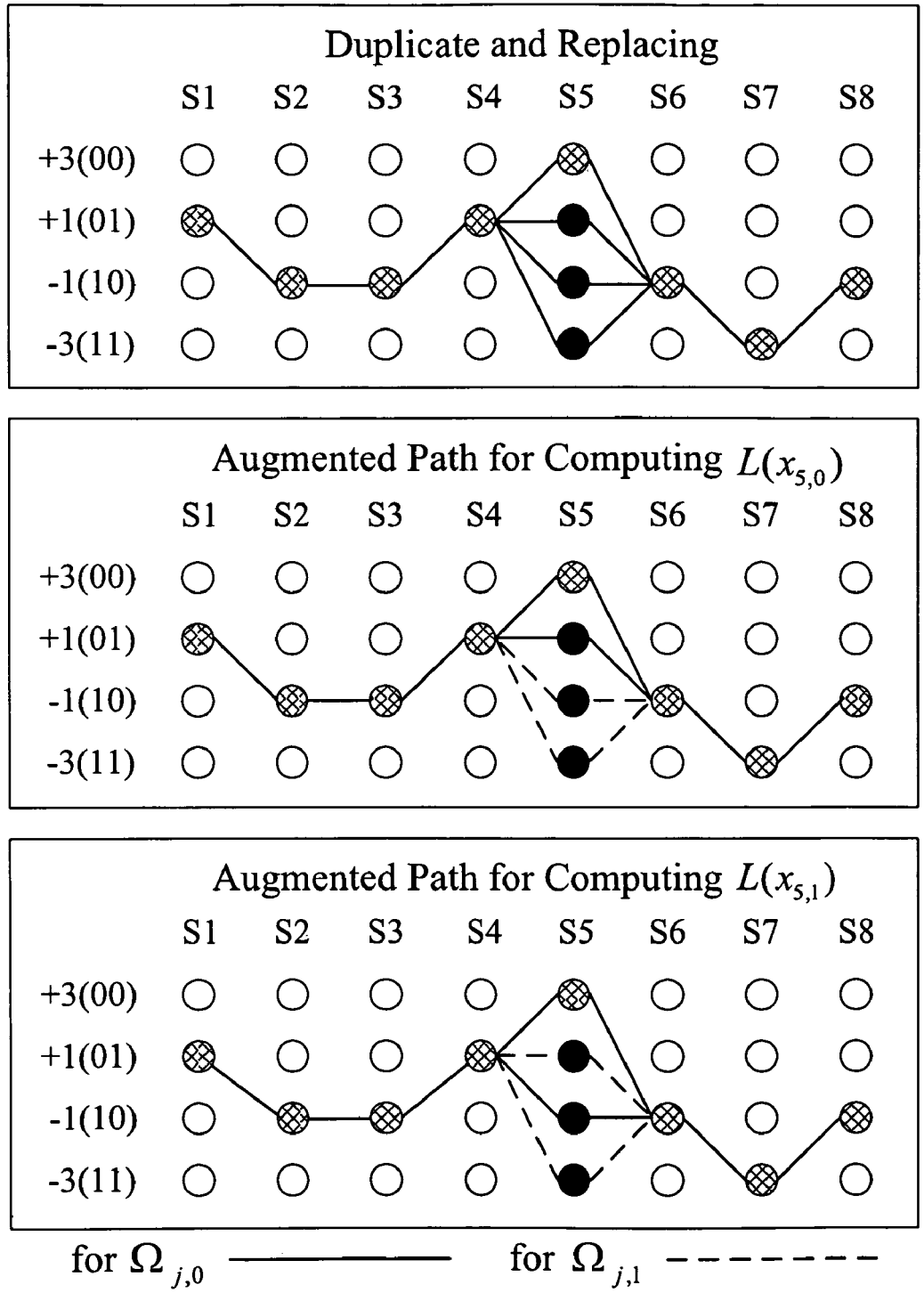
FIG. 4 is diagram schematically showing an example of the operation of the path augmentation device according to the present invention.

For example, please refer to FIG. 4 for a diagram schematically showing an example of the operation of the path augmentation device 316 according to the present invention. Assume that the path augmentation device 316 is used for computing $L(x_{5,0})$ and $L(x_{5,1})$ in a 16-QAM 4×4 MIMO system. The equivalent 4-PAM 8-layered tree can be represented by an 8-stage trellis diagram. Each path s' in L corresponds to a path in the trellis. In this example, s'={+1,−1,−1,+1,+3,−1,−3,−1}, M=4, and $\Omega$={−3,−1,+1,+3}. The path augmentation device 316 can expand the path s' to the four distinct path that contains all constellation points of $s_5$ for computing $L(x_{5,0})$ and $L(x_{5,1})$ by the duplicating-and-replacing procedure. As shown in FIG. 4, the solid lines are for $\Omega_{j,0}$ and the dashed lines are for $\Omega_{j,1}$.

The above-mentioned procedure needs to be performed $2N_t$ times for decoding s, and the equation (16) is the major computation overhead. Note that $\Delta_j$ have limited values and ranges, and they can be realized by a simple look up table or a decoder. Please note that, in this embodiment, the path s' can be expanded to unlimited M paths. However, considering the overhead from the path augmentation device 316, $L_k$ can also be augmented partially. That is, the soft values can be generated by the $|L|\times M$ most reliable paths for 0<M<1. The value M can provide a tradeoff between complexity and error performance.

Moreover, the path augmentation device 316 in the present invention can further perform the dynamic compensation by introducing an additive correction term to improve the approximation accuracy of the channel decoder 318 and to improve the error performance. Here, let $n_0$ and $n_1$ denote the sizes of $\Omega_{j,0}\cap L_k$ and $\Omega_{j,1}\cap L_k$ respectively, and $n_0+n_1=|L|$. Moreover, let $$m_0 = \min_{s'\in\Omega_{j,0}} \|q - Rs'\|^2 \quad (17)$$

And $$m_1 = \min_{s'\in\Omega_{j,1}} \|q - Rs'\|^2 \quad (18)$$

And the path augmentation device 316 can express the equation (10) in the conventional list sphere decoding algorithm as follows:

$$\log\frac{\sum_{s'\in\Omega_{j,0}} Pr(y|s')}{\sum_{s'\in\Omega_{j,1}} Pr(y|s')} = \tag{19}$$

$$\log\frac{\sum_{s'\in\Omega_{j,0}} Pr(q|s')}{\sum_{s'\in\Omega_{j,1}} Pr(q|s')} = \frac{(m_1-m_0)}{2\sigma^2} + \log\frac{1+\sum_{i=1}^{n_0-1} e^{\frac{-1}{2\sigma^2}(a_i-m_0)}}{1+\sum_{i=1}^{n_1-1} e^{\frac{-1}{2\sigma^2}(b_i-m_1)}}$$

where $\{m_0, a_1, a_2, \ldots, a_{n0-1}\} = \{T(s')|\forall s'\in\Omega_{j,0}\cap L\}$, and $\{m_1, b_1, b_2, \ldots, b_{n1-1}\} = \{T(s')|\forall s'\in\Omega_{j,1}\cap L\}$. For sufficiently large list size, $$\log\frac{n_0}{n_1} \approx \frac{Pr(x_j=0)}{Pr(x_j=1)},$$

which is the intrinsic information required by an maximum "a posteriori" (MAP) detector.

The second term in (19) and the intrinsic information can be combined as $$\beta\log\frac{1+n_0}{1+n_1} \cong \log\frac{\left(1+\sum_{i=1}^{n_0-1} e^{\frac{-1}{2\sigma^2}(a_i-m_0)}\right)}{\left(1+\sum_{i=1}^{n_1-1} e^{\frac{-1}{2\sigma^2}(b_i-m_1)}\right)} + \log\frac{Pr(x_j=0)}{Pr(x_j=1)} \tag{20}$$

where $$\frac{n_0}{n_1}$$

is modified to $$\frac{1+n_0}{1+n_1}$$

to avoid logarithm of zero or infinity. Ultimately, the soft value generated by the soft value generation device 314 will be:

$$L(x_{k,j}) \approx \frac{-1}{2\sigma^2}\left(m_1 - m_0 + \beta\log\frac{1+n_0}{1+n_1}\right) \tag{21}$$

$$\approx \left(m_1 - m_0 + \beta\log\frac{1+n_0}{1+n_1}\right) \tag{22}$$

where $\beta$ is a normalization factor, and $n_1 = |L| - n_0$. From the equation (21), the computation overhead resulted from the dynamic compensation $$\beta\log\frac{1+n_0}{1+n_1}$$

are one multiplication, two logarithms, and at most $|L|+1$ additions for accumulating $n_0$. Moreover, $m_0$ (or $m_1$) will be estimated by the maximum path metric in L if $\Omega_{j,0}\cap L_k$ (or $\Omega_{j,1}\cap L_k$) is empty set. Please note that, in this embodiment, the calculation of the soft value $L(x_{k,j})$ in the equation (21) and (22) is the estimated value suitable for current model. However, the calculation of the soft value $L(x_{k,j})$ is not limited to the above definition. That is, in other embodiments, the soft value $L(x_{k,j})$ can be assigned by different conditions depending on design requirements. For example, for simplicity, the soft value generation device 314 can alternatively generate the soft value $L(x_{k,j})$ by:

$$L(x_{k,j}) \approx m_1 - m_2 \tag{23}$$

Figure 5:
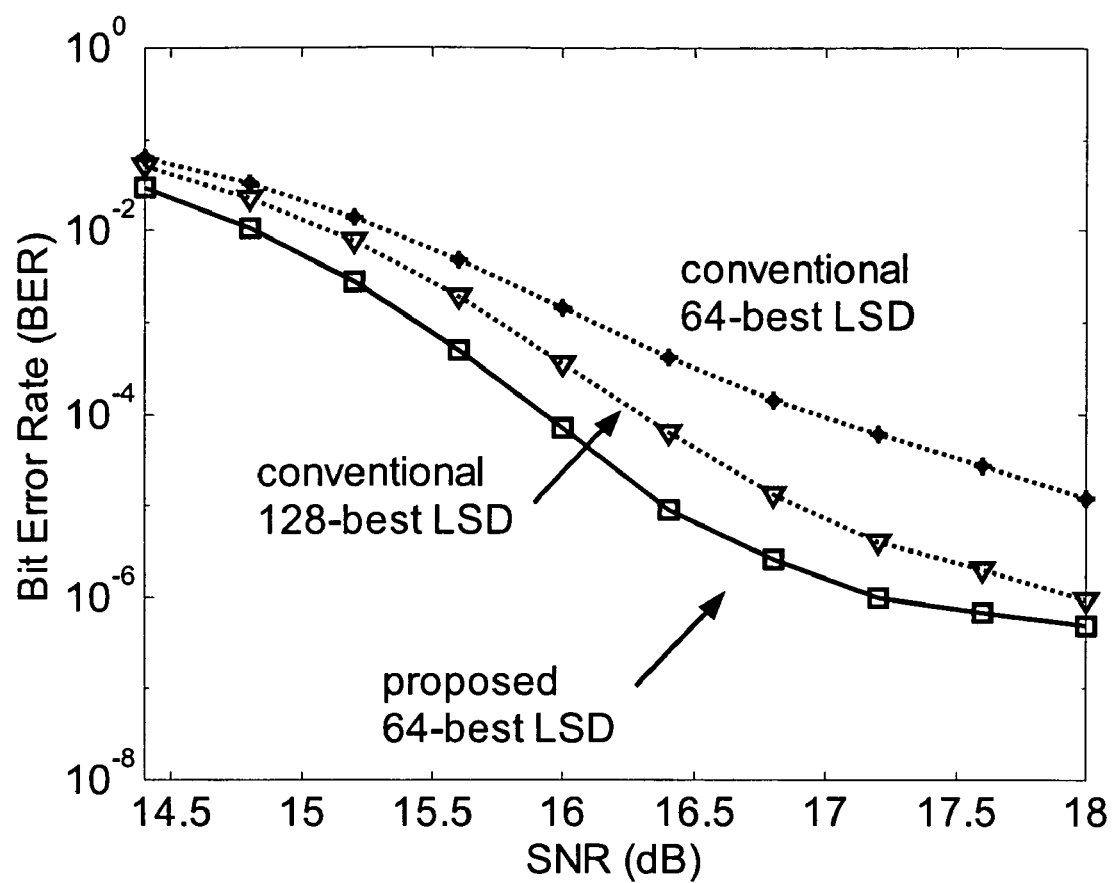
FIG. 5 is a diagram schematically showing a simulation result according to the present invention.

Please refer to FIG. 5 for a diagram schematically showing a simulation result according to the present invention. The simulation is based on a 4×4 MIMO system wherein (648, 324) and (1944, 972) LDPC codes of IEEE802.11n is applied as channel coding schemes. The candidate list generation is realized by the K-best algorithm. To achieve the BER lower than $10^{-5}$, FIG. 5 shows that the conventional LSDs should have the list size K larger than 128. However, as shown in FIG. 5, the proposed candidate list augmentation scheme (A-LSD) in the present invention can achieve SNR improvement from 0.3 dB to 1 dB, depending on K value, and the improvement becomes more apparent when K value is smaller. That is, the path augmentation algorism in the present invention results in equivalently more available candidates, and therefore 64-best A-LSD has the lowest error floor.

Based on the present invention, the path augmentation algorithm in the present invention guarantees a low probability of failing to find the minimizers. Actually, the computation overhead from list expansion by the path augmentation device 316 is usually smaller as compared to direct generation of a larger candidate list in the conventional MIMO system. Moreover, the path augmentation algorithm in the present invention can be applied in different decoding algorithm, for instance, sphere decoding, list decoding, M-algorithm, T-algorithm, or K-best algorithm. Besides, an additive correction term is introduced to dynamically compensate the approximation loss in the conventional list sphere decoding scheme. Combining the two proposed schemes, the MIMO system with candidate list augmentation scheme in the present invention significantly reduce the calculation complex and perceive improvement in error performance.

Those described above are only the preferred embodiments to exemplify the present invention but not to limit the scope of the present invention. Any equivalent modification or variation according to the shapes, structures, features and spirit disclosed in the specification is to be also included within the scope of the present invention.

What is claimed is:

1. A candidate list augmentation device for channel coding systems, said device comprising:
   a candidate list generation device for receiving an input signal within a channel coding system and generating a candidate list according to said input signal;

a path augmentation device, coupled to said candidate list generation device, for augmenting paths in the candidate list according to said candidate list and generate an augmented list; and a soft value generation device, coupled to said candidate list generation device and said path augmentation device, for comparing said input signal and said augmented list and generating a soft value according to said input signal, said candidate list and said augmented list, wherein said soft value is utilized for error correcting in decoding said input signal;

wherein said path augmentation device generates said augmented list by expanding each said path in said candidate list to M paths by duplicating each said path M−1 times; and replacing said k-th bit information in said M paths by a distinct $\omega_j$ from an original set $\Omega=\{\omega_j \mid j=0, 1, \ldots, M-1\}$.

2. The candidate list augmentation device of claim 1, wherein said candidate list comprises a plurality of paths, and each said path comprises a plurality of bit information for decoding said input signal.

3. The candidate list augmentation device of claim 1, wherein said candidate list generation device can generate said candidate list by the sphere decoding algorithm, the list decoding algorithm, M-algorithm, T-algorithm, or K-best algorithm.

4. The candidate list augmentation device of claim 1, wherein said channel coding system includes coded MIMO system.

5. The candidate list augmentation device of claim 1, wherein said path augmentation device could separate said M paths in said candidate list into a first set $\Omega_{j,0}$ and a second set $\Omega_{j,1}$ wherein said first set $\Omega_{j,0}$ denotes j-th bit information of said paths in said first set is in a first digit (zero), and $\Omega_{j,1}$ denotes j-th bit information of said paths in said second set is in a second digit (one).

6. The candidate list augmentation device of claim 5, wherein said path augmentation device can calculate a first minimizer m0 for said first set $\Omega_{j,0}$ by $$m_0 = \min_{s' \in \Omega_{j,0}} \|q - Rs'\|^2,$$

and a second minimizer m1 for said second set $\Omega_{j,0}$ by $$m_1 = \min_{s' \in \Omega_{j,1}} \|q - Rs'\|^2, \text{ wherein } \|q - Rs'\|^2$$

refers to the path metric of said candidate list.

7. The candidate list augmentation device of claim 6, wherein said soft value generation device generated said soft value L(xk,j) by the following equation:

$$L(x_{k,j}) \approx \frac{-1}{2\sigma^2}\left(m_1 - m_0 + \beta\log\frac{1+n_0}{1+n_1}\right)$$

wherein $\sigma^2$ is the noise variance, $\beta$ is a normalization factor, n0 and n1 denote the sizes of $\Omega_{j,0}$ and $\Omega_{j,1}$ respectively, and n0+n1 are equal to the size of said candidate list.

8. The candidate list augmentation device of claim 6, wherein said soft value generation device generated said soft value L(xk,j) by the following equation:

$$L(x_{k,j}) \approx m_1 - m_0 + \beta\log\left(\frac{1+n_0}{1+n_1}\right)$$

wherein $\beta$ is a normalization factor, n0 and n1 denote the sizes of $\Omega_{j,0}$ and $\Omega_{j,1}$ respectively, and n0+n1 are equal to the size of said candidate list.

9. The candidate list augmentation device of claim 6, wherein said soft value generation device generated said soft value L(xk,j) by the following equation:

$$L(x_{k,j}) \approx m_1 - m_0.$$

10. An candidate list augmentation method for channel coding systems, said method comprising:
 (1) receiving an input signal and generating a candidate list according to said input signal;
 (2) generating an augmented list according to said candidate list; and
 (3) comparing said input signal and said augmented list and generating a soft value according to said input signal, said candidate list and said augmented list, wherein said soft value is utilized for error correcting in decoding said input signal;
 wherein said step (2) further comprises:
  expanding each said path in said candidate list to M paths by duplicating each said path M−1 times; and
  replacing said k-th bit information in said M paths by a distinct $\omega_j$ from an original set $\Omega=\{\omega_j | j=0, 1, \ldots, M-1\}$ in said candidate list.

11. The candidate list augmentation method of claim 10, wherein said candidate list comprises a plurality of paths, and each said path comprises a plurality of bit information for decoding said input signal.

12. The candidate list augmentation method of claim 10, wherein said step (1) further comprises: generating said candidate list by the sphere decoding algorithm, the list decoding algorithm, M-algorithm, T-algorithm, or K-best algorithm.

13. The candidate list augmentation method of claim 10, wherein said step (2) further comprises: separating said M paths in said candidate list into a first set $\Omega_{j,0}$ and a second set $\Omega_{j,1}$, wherein said first set $\Omega_{j,0}$ denotes j-th bit information of said paths in said first set is in a first digit (zero), and $\Omega_{j,1}$ denotes j-th bit information of said paths in said second set is in a second digit (one).

14. The candidate list augmentation method of claim 13, wherein a first minimizer m0 can be calculated for said first set $\Omega_{j,0}$ by $$m_0 = \min_{s' \in \Omega_{j,0}} \|q - Rs'\|^2,$$

and a second minimizer m1 can be calculated for said second set $\Omega_{j,0}$ by, $$m_1 = \min_{s' \in \Omega_{j,1}} \|q - Rs'\|^2,$$

wherein $\|q-Rs'\|^2$ refers to the path metric of said candidate list.

15. The candidate list augmentation method of claim 14, wherein said soft value L(xk,j) can be generated by the following equation:

$$L(x_{k,j}) \approx \frac{-1}{2\sigma^2}\left(m_1 - m_0 + \beta\log\frac{1+n_0}{1+n_1}\right)$$

wherein $\sigma^2$ is the noise variance, $\beta$ is a normalization factor, n0 and n1 denote the sizes of $\Omega_{j,0}$ and $\Omega_{j,1}$ respectively, and n0+n1 are equal to the size of said candidate list.

16. The candidate list augmentation method of claim 14, wherein said said soft value L(xk,j) can be generated by the following equation:

$$L(x_{k,j}) \approx m_1 - m_0 + \beta\log\left(\frac{1+n_0}{1+n_1}\right)$$

wherein $\beta$ is a normalization factor, n0 and n1 denote the sizes of $\Omega_{j,0}$ and $\Omega_{j,1}$ respectively, and n0+n1 are equal to the size of said candidate list.

17. The candidate list augmentation method of claim 14, wherein said said soft value L(xk,j) can be generated by the following equation:

$$L(x_{k,j}) \approx m_1 - m_0.$$

* * * * *